United States Patent
Lehtiniemi et al.

(10) Patent No.: US 11,205,307 B2
(45) Date of Patent: Dec. 21, 2021

(54) RENDERING A MESSAGE WITHIN A VOLUMETRIC SPACE

(71) Applicant: Nokia Technologies Oy, Espoo (FI)

(72) Inventors: Arto Lehtiniemi, Lempaala (FI); Antti Johannes Eronen, Tampere (FI); Jussi Leppänen, Tampere (FI); Juha Henrik Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/962,455

(22) PCT Filed: Apr. 1, 2019

(86) PCT No.: PCT/IB2019/052671
§ 371 (c)(1),
(2) Date: Jul. 15, 2020

(87) PCT Pub. No.: WO2019/197938
PCT Pub. Date: Oct. 17, 2019

(65) Prior Publication Data
US 2021/0074070 A1 Mar. 11, 2021

(30) Foreign Application Priority Data
Apr. 12, 2018 (EP) .................................. 18166947

(51) Int. Cl.
*G06T 19/00* (2011.01)
*G06T 7/73* (2017.01)
*G02B 27/00* (2006.01)
*G06F 3/01* (2006.01)

(52) U.S. Cl.
CPC ........ *G06T 19/006* (2013.01); *G02B 27/0093* (2013.01); *G06F 3/013* (2013.01); *G06T 7/75* (2017.01)

(58) Field of Classification Search
CPC .................................................... G06T 19/006
See application file for complete search history.

(56) References Cited

U.S. PATENT DOCUMENTS

| | | |
|---|---|---|
| 2009/0015658 A1 | 1/2009 | Enstad et al. |
| 2012/0299817 A1 | 11/2012 | Atkins et al. |
| 2014/0002351 A1 | 1/2014 | Nakayama |
| 2014/0176813 A1 | 6/2014 | Conness et al. |
| 2014/0328505 A1 | 11/2014 | Heinemann et al. |
| 2015/0020003 A1 | 1/2015 | Karam |

(Continued)

OTHER PUBLICATIONS

"Sony's 'Joshua Bell VR Experience' on PSVR is Among the Best VR Video You'll Find on Any Headset", Road Tovr, Retrieved on Jul. 15, 2020, Webpage available at: https://www.roadtovr.com/now-psvr-sonys-joshua-bell-vr-experience-among-best-vr-video-youll-find-headset/.

(Continued)

*Primary Examiner* — Shivang I Patel
(74) *Attorney, Agent, or Firm* — International IP Law Group, PLLC (57) ABSTRACT

An apparatus and method is described, including: determining a position of a plurality of users within a volumetric space; and determining a rendering of a message within the volumetric space, based, at least in part, on the determined positions of said users, such that the message is one or more of: visible to, audible by and touchable by each of said users.

16 Claims, 6 Drawing Sheets

(56) References Cited

U.S. PATENT DOCUMENTS

| | | |
|---|---|---|
| 2015/0054739 A1 | 2/2015 | Itoh |
| 2015/0281887 A1 | 10/2015 | Johnson et al. |
| 2016/0025981 A1 | 1/2016 | Burns et al. |
| 2016/0026253 A1* | 1/2016 | Bradski ............... H04N 13/344 345/8 |
| 2016/0063766 A1 | 3/2016 | Han et al. |
| 2016/0070356 A1 | 3/2016 | Aguirre et al. |
| 2016/0093108 A1 | 3/2016 | Mao et al. |
| 2017/0090420 A1 | 3/2017 | Rotschild et al. |

OTHER PUBLICATIONS

"Soloshot 3", Soloshot, Retrieved on Jul. 15, 2020, Webpage available at: https://soloshot.com/#.

"Augmented (hyper)Reality: Domestic Robocop", Youtube, Retrieved on Jul. 15, 2020, Webpage available at: https://www.youtube.com/watch?v=fSfKICmYcLc.

Shah et al., "Metrics For Measuring Ideation Effectiveness", Design Studies, vol. 24, No. 2, Mar. 2003, pp. 111-134.

Smith., "Idea-Generation Techniques: A Formulary of Active Ingredients", Journal of creative behavior, vol. 32, No. 2, 1998, pp. 107-133.

Smith, "Towards a logic of innovation", The International Handbook on Innovation, Dec. 2003. p. 347-365.

"Designing Subtitles for 360° Content", BBC, Retrieved on Jul. 15, 2020, Webpage available at: https://www.bbc.co.uk/rd/blog/2017-03-subtitles-360-video-virtual-reality.

Haffegee et al., "Eye Tracking and Gaze Based Interaction Within Immersive Virtual Environments", International Conference on Computational Science, Part of the Lecture Notes in Computer Science, vol. 5545, 2009, pp. 729-736.

Extended European Search Report received for corresponding European U.S. Appl. No. 18166947.4, dated Oct. 30, 2018, 6 pages.

International Search Report and Written Opinion received for corresponding Patent Cooperation Treaty Application No. PCT/IB2019/052671, dated Jul. 1, 2019, 12 pages.

\* cited by examiner

RENDERING A MESSAGE WITHIN A VOLUMETRIC SPACE

RELATED APPLICATION

This application claims priority to PCT Application No. PCT/IB2019/052671, filed on Apr. 1, 2019, which claims priority to European Application No. 18166947.4, filed on Apr. 12, 2018, each of which is incorporated herein by reference in its entirety.

FIELD

The present specification relates to rendering a message within a volumetric space.

BACKGROUND

Virtual reality (VR) is a rapidly developing area of technology in which video content is provided to a VR display system. As is known, a VR display system may be provided with a live or stored feed from a video content source, the feed representing a VR space or world for immersive output through the display system. In some embodiments, audio is provided, which may be spatial audio. A VR headset may be configured to provide VR video and audio content to the user, e.g. through the use of a pair of video screens and headphones incorporated within the headset.

Mixed reality (MR) is an area of technology in which real and virtual worlds are combined such that physical and digital objects co-exist and interact in real time.

Augmented reality (AR) refers to a real-world view that is augmented by computer-generated sensory input. In the context of the present specification, the term mixed reality is intended to encompass augmented reality.

Immersive content may be provided, for example, in virtual reality, augmented reality or mixed reality scenes. There remains a need for controlling the display of objects within such scenes.

SUMMARY

In a first aspect, this specification describes an apparatus comprising: means for determining a position of a plurality of users, each having a different position within a volumetric space (which space may be one or more of a virtual reality, augmented reality or mixed reality space); and means for determining a rendering of a message within the volumetric space based, at least in part, on the determined positions of said users, such that the message is one or more of: visible to, audible by and/or touchable by each of said users. The apparatus may further comprise means for rendering the message based on the determined rendering.

In some embodiments, there is provided means for determining an orientation of each of said users. The said means for determining the orientation of each of said users may include means for determining a gaze direction of each of said users. The means for determining the rendering of the message within the volumetric space may determine the rendering based, at least in part, on the determined orientation of said users.

The apparatus may further comprise means for determining a change in a position and/or orientation of one or more of said users, wherein said means for determining the rendering of the message includes updating the rendering of the message within the volumetric space based on the determined change.

In some embodiments, the means for determining the rendering of the message may comprise rendering the message within the volumetric space such that the message is available to all of said users that have not acknowledged the message.

In embodiments wherein the message is audible by the users, the means for determining the rendering of a message within the volumetric space may comprise: defining an audio volume of the message depending on the location of the users; and/or defining an audio directionality of the message depending on the location of the users.

The plurality of users may be relevant users, such that the message is directed to said relevant users.

The message may be one or more of an audio, visual image, visual video, text or tactile message.

In some embodiments, the said means may comprise: at least one processor; and at least one memory including computer program code, the at least one memory and computer program code configured to, with the at least one processor, cause the performance of the apparatus.

In a second aspect, this specification describes a method comprising: determining a position of a plurality of users within a volumetric space; and determining a rendering of a message within the volumetric space based, at least in part, on the determined positions of said users, such that the message is one or more of: visible to, audible by and touchable by each of said users. The method may comprise rendering the message accordingly.

The method may further comprise determining an orientation of each of said users (e.g. by determining a gaze direction of each of said users). Determining the rendering of the message within the volumetric space may determine the rendering based, at least in part, on the determined orientation of said users.

The method may further comprise determining a change in a position and/or orientation of one or more of said users. The said means for determining the rendering of the message may include updating the rendering of the message within the volumetric space based on the determined change.

Rendering of a message within the volumetric space may further comprise rendering the message such that the message is available to all of said users that have not acknowledged the message.

In some forms of the invention, the message may be audible by the users. The means for determining a rendering of a message within the volumetric space may comprise: defining an audio volume of the message depending on the location of the users; and/or defining an audio directionality of the message depending on the location of the users.

In some embodiments, the volumetric space for at least some of the users may have different dimensions, wherein: the means for determining the rendering of the message may comprise rendering the message such that the message is available to all users regardless of the different volumetric space dimensions.

In a third aspect, this specification describes an apparatus configured to perform the method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions stored thereon for performing at least the following: determining a position of a plurality of users within a volumetric space; and determining a rendering of a message within the volumetric space based, at least in part, on the determined positions of said users, such that the message is one or more of: visible to, audible by and touchable by each of said users.

In a sixth aspect, this specification describes a non-transitory computer-readable medium comprising program instructions stored thereon for performing at least the following: determining a position of a plurality of users within a volumetric space; and determining a rendering of a message within the volumetric space based, at least in part, on the determined positions of said users, such that the message is one or more of: visible to, audible by and touchable by each of said users.

In a seventh aspect, this specification describes an apparatus comprising: at least one processor; and at least one memory including computer program code which, when executed by the at least one processor, causes the apparatus to: determine a position of a plurality of users within a volumetric space; and determine a rendering of a message within the volumetric space based, at least in part, on the determined positions of said users, such that the message is one or more of: visible to, audible by and touchable by each of said users.

BRIEF DESCRIPTION OF THE DRAWINGS

Example embodiments will now be described, by way of non-limiting examples, with reference to the following schematic drawings, in which.

DETAILED DESCRIPTION

Figure 1:
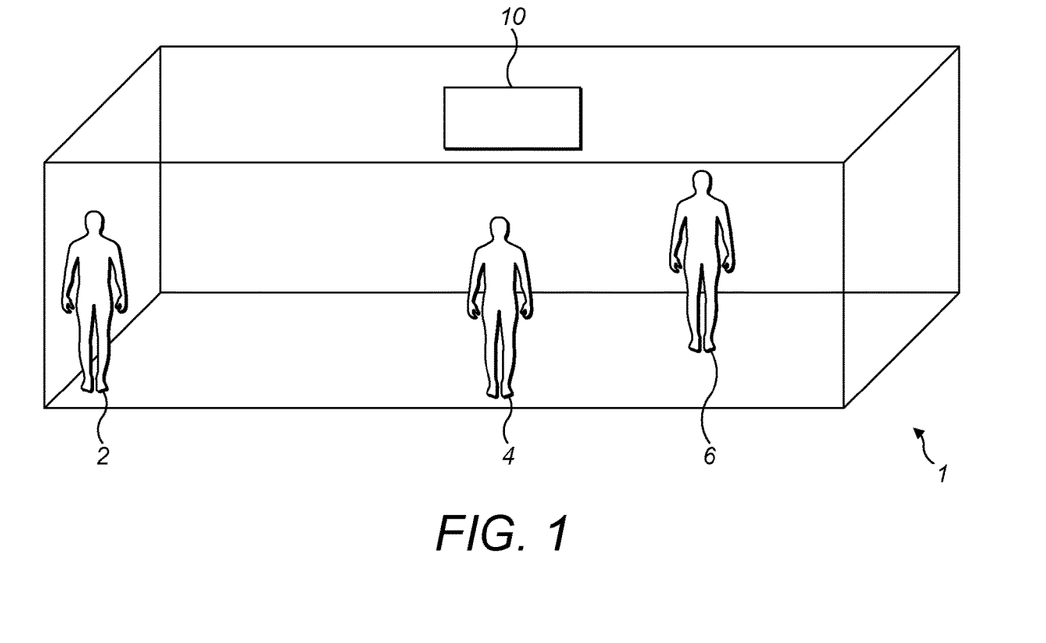
FIG. 1 shows a volumetric space in accordance with an example embodiment.

FIG. 1 shows a volumetric space, indicated generally by the reference numeral 1, in accordance with an example embodiment. A first user 2, a second user 4 and a third user 6 are shown within the volumetric space 1. The users are free to move around the volumetric space 1 and may be orientated in any direction. The users can view virtual content available within the volumetric space 1.

Assume that a message is sent to a group of users including the first, second and third users 2 to 6. The message may, for example, be an advertisement, a communication to the group from inside or outside a virtual reality world, a status message related to the volumetric VR world etc. The message may be displayed within the volumetric space (see the example message 10, for example). However, if users are looking in different directions, the message may not be visible to all users.

Figure 2:
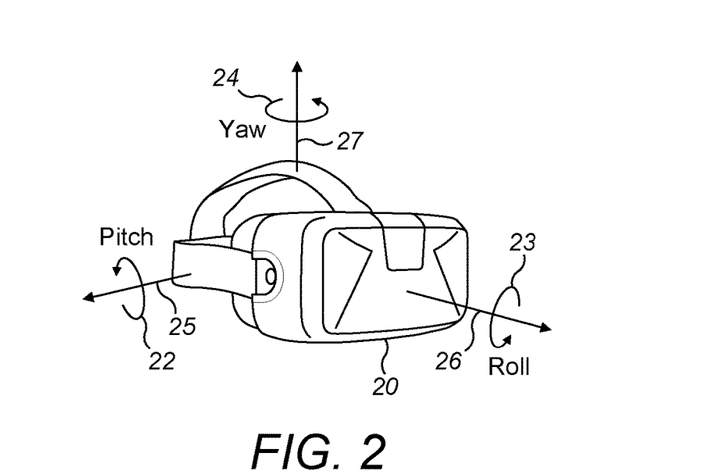
FIG. 2 shows a virtual reality or augmented reality headset.

FIG. 2 shows a virtual reality or augmented reality headset 20, for displaying visual data for a virtual reality or augmented reality space. The headset 20 may comprise augmented reality (AR) glasses, which may enable visual content, for example one or more virtual objects, to be projected or displayed on top of a see-through portion of the glasses. The users 2, 4 and 6 may, for example, experience virtual content within the volumetric space 1 by means of the headset 20 (or a similar device).

The headset 20 receives the virtual reality or augmented reality content data, for example from a media player (not shown). Here, the media player may comprise a mobile phone, smartphone or tablet computer configured to play content through its display. For example, the media player may be a touchscreen device having a large display over a major surface of the device, through which video content can be displayed. The media player may be inserted into a holder of a headset 20. With such headsets 20, a smart phone or tablet computer may display visual data which is provided to a user's eyes via respective lenses in the headset 20.

The headset 20 may include means for determining the spatial position of the user and/or orientation of the user's head. This may be by means of determining the spatial position and/or orientation of the headset 20. Over successive time frames, a measure of movement may therefore be calculated and stored. For example, the headset 20 may incorporate motion tracking sensors which may include one or more of gyroscopes, accelerometers and structured light systems. These sensors may generate position data from which a current visual field-of-view (FOV) is determined and updated as the user, and so the headset 20, changes position and/or orientation. The headset 20 may comprise two digital screens for displaying stereoscopic video images of the virtual world in front of respective eyes of the user, and also two speakers for delivering audio, if provided. The example embodiments herein are not limited to a particular type of headset 20.

In some example embodiments, the spatial position and/or orientation of the user's head may be determined using a six-degrees-of-freedom (6DoF) method. As shown in FIG. 1, these include measurements of pitch 22, roll 23 and yaw 24 and also translational movement in Euclidean space along side-to-side, front-to-back and up-and-down axes 25, 26 and 27. (The use of a six-degrees-of-freedom headset is not essential. For example, a three-degrees-of-freedom headset could readily be used.)

The display system 20 may be configured to display virtual reality or augmented reality content data to the users 2, 4 and 6 based on spatial position and/or the orientation of the headset 20 worn by the users. A detected change in spatial position and/or orientation, i.e. a form of movement, may result in a corresponding change in the visual data to reflect a position or orientation transformation of the users with reference to the volumetric space 1 into which the visual data is projected. This allows virtual reality content data to be consumed with the users experiencing a 3D virtual reality or augmented reality environment.

As described above, a message may be sent to the users within the volumetric space 1 and that message may be displayed to the first user 2, the second user 4 and the third user 6 within the volumetric space. If those users are looking in different directions, then it would be possible to overlay the volumetric content provided to each user with the message. However, overlaying messages on screens with potentially small fields of view and potentially blocking some other content may not provide a good user experience. Moreover, if the users are experiencing the same volumetric content, then it may be more natural if the presented message was the same for all users. For example, although users (such as the users 2 to 6) may be located in different parts of a volumetric space, a message may be rendered in the same part of the volumetric space 1 for all users, thereby creating an aligned perception of the volumetric space for each user.

Figure 3:
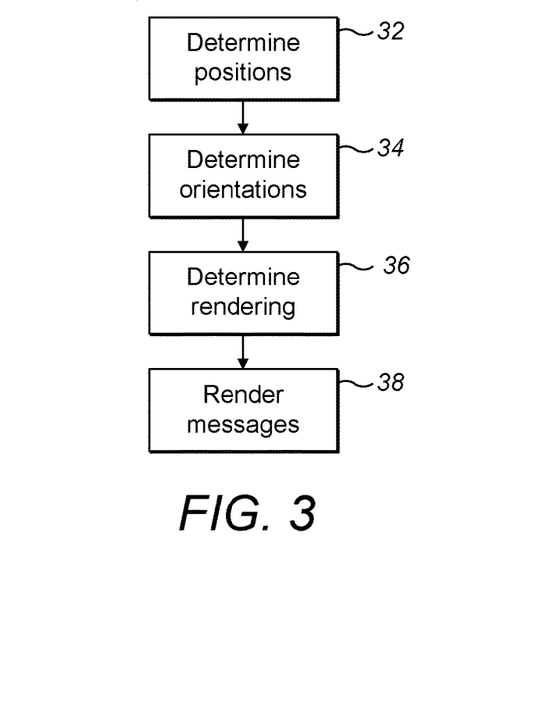
FIG. 3 is a flow chart showing an algorithm in accordance with an example embodiment.

FIG. 3 is a flow chart showing an algorithm, indicated generally by the reference numeral 30, in accordance with an example embodiment. The algorithm 30 starts at operation 32 where the positions of each of a number of users within a volumetric space are determined. This determination could be made, for example, based on the positions of headset worn by the users.

The algorithm 30 includes an operation 34 in which orientations of the users are determined (for example, based on gaze directions of the users). One method for determine gaze direction is to use video-based eye-trackers. A camera may focus on one or both eyes of the user and record eye movement as the user looks at some visual stimulus. Eye-trackers may use the centre of the pupil and infrared/near infra-red non-collimated light to create corneal reflections (CR). The vector between the pupil centre and the corneal reflections can be used to compute the point of regard on a surface or the gaze direction. Other methods for detecting gaze direction include eye-attached tracking, movement of the eye being detected with a special contact lens with an embedded mirror or magnetic field sensor. One method is to use electric potentials measured with electrodes placed around the eye. It should be noted that determining the orientation of users is not required in all embodiments. For example, as described below, a message provided to users may be an audio message; in such circumstances, the orientation of the users may not be important.

At operation 36, appropriate rendering of the message (based, at least in part, on the position and/or orientation of the users) is determined. The messages are then rendered accordingly in operation 38.

Figure 4:
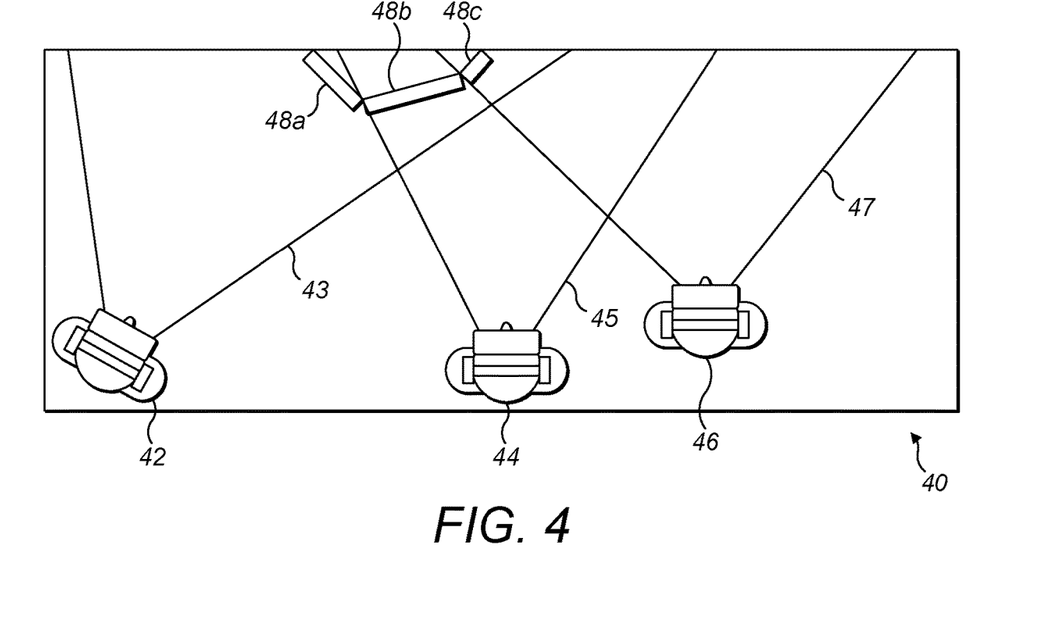
FIG. 4 is a plan view of a volumetric space in accordance with an example embodiment.

FIG. 4 is a plan view of a volumetric space, indicated generally by the reference numeral 40, in accordance with an example embodiment. A first user 42, a second user 44 and a third user 46 are shown within the volumetric space 40. The operation 32 of the algorithm 30 may determine the position of each of the first, second and third users 42 to 46 within the space 40.

As shown in FIG. 4, the first user 42 has an orientation indicated by field-of-view (e.g. gaze direction) 43, the second user 44 has an orientation indicated by field-of-view (e.g. gaze direction) 45, and the third user 46 has an orientation indicated by field-of-view (e.g. gaze direction) 47. Thus, the operation 34 of the algorithm 30 may determine the orientation of each of the first, second and third users 42 to 46 within the space 40.

In operation 36, appropriate rendering of the message (based on the positions and/or orientations of the users) is determined. As shown on FIG. 4, the message is rendered in three parts: a first message part 48a is directed towards the first user 42, a second message part 48b is directed towards the second user 44 and a third message part 48c is presented towards the third user 46 (with those parts collectively forming a message 48). The parts of the message are rendered accordingly in operation 38 of the algorithm 30.

In this way, the algorithm 30 can be used to modify the images of the message so that they may be optically perceivable from the locations of each of the users within the space 40. For example, the positions and/or orientations of the presented messages may be selected such that maximally large portions of the message are visible to the users. It should be noted that, in some embodiments, the users to whom the message is directed are a subset of the all users consuming the volumetric content within the space 40. In such circumstances, the algorithm 30 may modify the images of the message so that the message is optically perceivable from the locations of each of the users to whom the message is directed.

Figure 5:
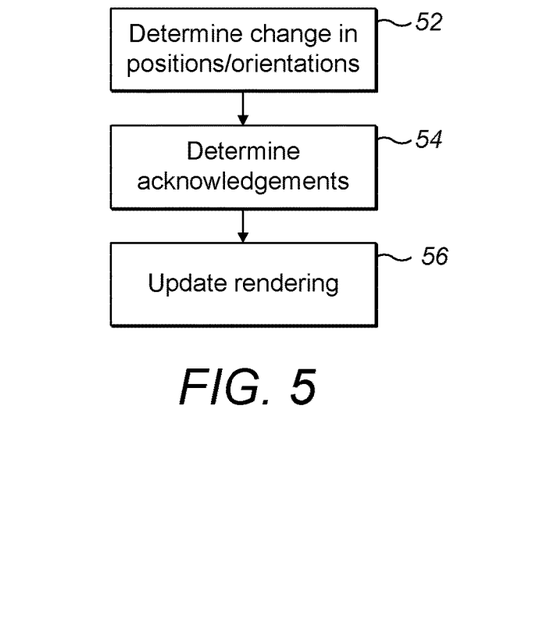
FIG. 5 is a flow chart showing an algorithm in accordance with an example embodiment.

FIG. 5 is a flow chart showing an algorithm, indicated generally by the reference numeral 50, in accordance with an example embodiment. The algorithm 50 starts at operation 52 where changes in the position and/or orientation of a user within a volumetric space are determined. This determination could be made, for example, based on the positions of headsets worn by the users. The determination could be made in other ways, such as using a camera to detect the locations of one or more users or detecting the locations of mobile communication devices (e.g. handsets) of one or more users.

The algorithm 50 includes an operation 54 in which acknowledgements of a message are determined. As described further below, a particular message may no longer be presented to a user once that user has acknowledged the message. A user may, for example, acknowledge a message by touching that message within the volumetric space. Acknowledgement of a message could be conducted in other ways, such as using gaze tracking or a voice input.

At operation 56, the rendering of the message is updated, based on changes in position and/or orientation of users and/or based on acknowledgements of a message.

Figure 6:
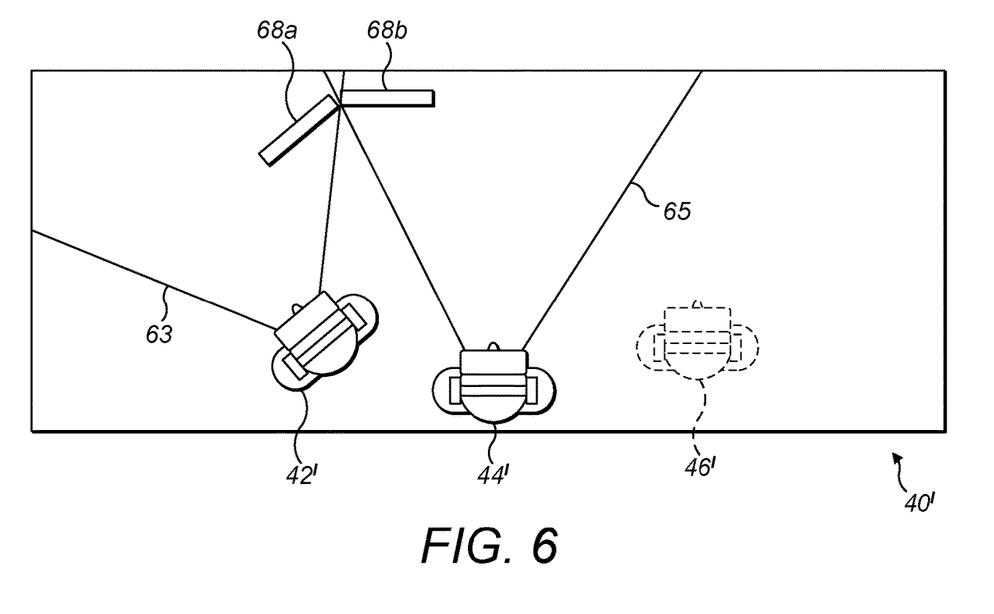
FIGS. 6 to 8 are plan views of volumetric spaces in accordance with example embodiments.

FIG. 6 is a plan view of a volumetric space, indicated generally by the reference numeral 40', in accordance with an example embodiment. The volumetric space 40' may be the same as the volumetric space 40 described above. A first user 42', a second user 44' and a third user 46' are shown within the volumetric space 40'. The first, second and third users within the space 40' may be the same users as described above with reference to the volumetric space 40, but at least some of those users may have different positions and/or orientations.

The operation 52 of the algorithm 50 may determine changes in the positions of one or more of the first, second and third users 42' to 46' within the space 40'. Thus, for example, the first user 42' may have moved to the right and rotated in an anti-clockwise direction (relative to the position and orientation of the first user 42 described above with reference to FIG. 4). The second and third users 44' and 46' may not have moved.

The operation 54 of the algorithm 50 may determine that the third user 46' has acknowledged the message 48c described above. This is represented in FIG. 6 by showing the third user 46' in dotted form.

As shown in FIG. 6, the first user 42' has an orientation indicated by field-of-view (e.g. gaze direction) 63 and the second user 44' has an orientation indicated by field-of-view (e.g. gaze direction) 65.

In operation 56, appropriate rendering of the message (based, at least in part, on the position and/or orientation of the users) is determined. As shown on FIG. 6, the message is rendered in two parts: a first message part 68a is directed towards the first user 42' and a second message part 68b is directed towards the second user 44'. No message part is directed towards the third user 46' since that user has acknowledged the message. The images of the message rendered accordingly in operation 56 of the algorithm 50.

The field-of-view (e.g. gaze direction) of the third user 46' is not shown in FIG. 6. The field-of-view (e.g. gaze direction) of the third user 46' (which may or may not be determined in the operation 52) is not relevant to operation 56 of the algorithm 50 since no message is presented to the third user 46'.

As described above, the algorithm 50 may be used to modify the images of the message so that they may be optically perceivable from the locations of each of the users as those locations change.

As described above, the message presented to users may be a visual message. This is not essential to all embodiments. For example, the message may be one or more of audio, visual image, visual video, text and/or tactile message.

Figure 7:
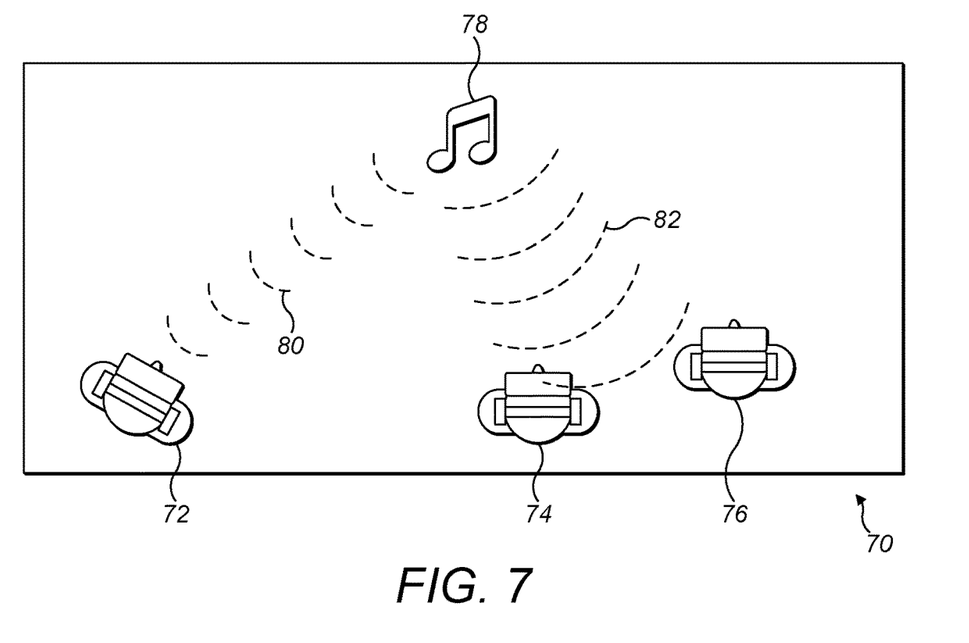

FIG. 7 is a plan view of a volumetric space, indicated generally by the reference numeral 70, in accordance with an example embodiment. A first user 72, a second user 74 and a third user 76 are shown within the volumetric space 70. Also shown in FIG. 7 is an audio message 78 that is rendered within the volumetric space 70.

The audio message 78 may be presented based, at least in part, on the position and/or orientation of the users 72 to 76. For example, the volume of the audio message may be such that it is audible to the users to which it is directed. Moreover, the audio message may be directional (regardless of whether the original audio message included a directional component). For example, as shown in FIG. 7, the audio message has a first direction 80 directed towards the first user 72 and a second direction 82 directed towards both the second user 74 and the third user 76. The audio may be boosted in the directions 80 and 82; indeed, the audio message may only be rendered in the directions 80 and 82 (although this is not essential in all embodiments). In some embodiments, the audio message 78 may be rendered such that is originates from a visually important object within the volumetric space 70.

As described above, the rendering of a message (such as the audio message 78) may be changed in response to an acknowledgement of the message by one or more of the users to whom the message is directed. For example, in the event that the third user 76 acknowledges the message 78, the audio message in the second direction 82 may be altered so that the audio is directed towards the second user 74 but not the third user 76.

Figure 8:
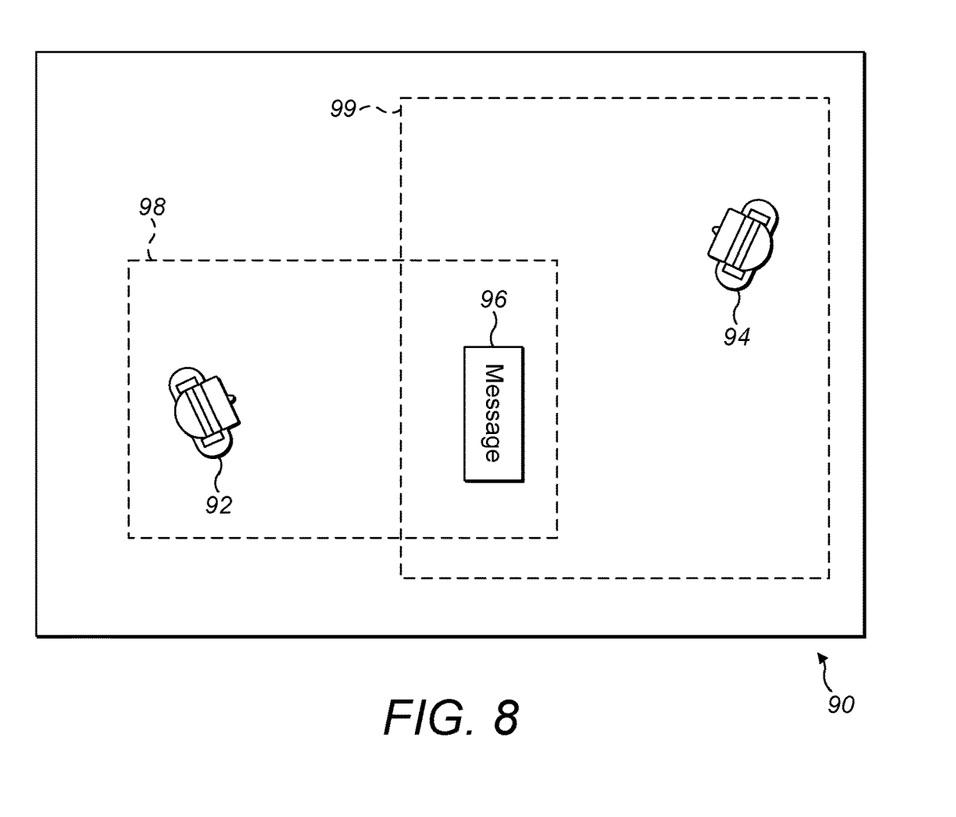

FIG. 8 is a plan view of a volumetric space, indicated generally by the reference numeral 90, in accordance with an example embodiment. A first user 92 and a second user 94 are shown within the volumetric space 90. A message 96 is rendered within the space 90. Assume that the first and second users 92 and 94 are both experiencing volumetric content from the space 90, but are physically located within different rooms (for example, rooms of their respective domestic apartments). The volumetric space as presented to the users may be mapped to the physical dimensions of the rooms in which the users are physically located. Thus, in the example shown in FIG. 8, a first portion 98 of the volumetric space 90 is rendered to the first user 92 and a second portion 99 of the volumetric space is rendered to the second user 94.

As shown in FIG. 8, a message 96 is presented to the first and second users 92 and 94. In order to be rendered such that the message 96 is visible to both the first user 92 and the second user 94, the message 96 is rendered in an area of overlap between the first portion 98 and the second portion 99 of the volumetric space 90. Note that although a single message 96 is shown, that message may be presented in separate parts, depending on a position and/or orientation of the users 92 and 94, as described in detail above.

As will be apparent from the discussion above, whilst the algorithms 30 and 50 may determine the position of multiple users within a space (such as the volumetric spaces 40, 40', 70 and 90) and render a message to multiple such users, the message may not necessarily be presented to all users within the space. For example, a message may be presented to a subset of users within the space (e.g. relevant users). Some users may be excluded, for example, because the message is not relevant to those users; other users may be excluded because they have acknowledged receipt of the message. In some embodiments, the message may be available (e.g. visible or audible) to users to whom the message is not directed; in other embodiments, the message may only be available (e.g. visible or audible) to users to whom the message is directed. In some embodiments, the position and/or orientation of all users within a volumetric space may be determined, but this is not essential to all example embodiments.

Figure 9:
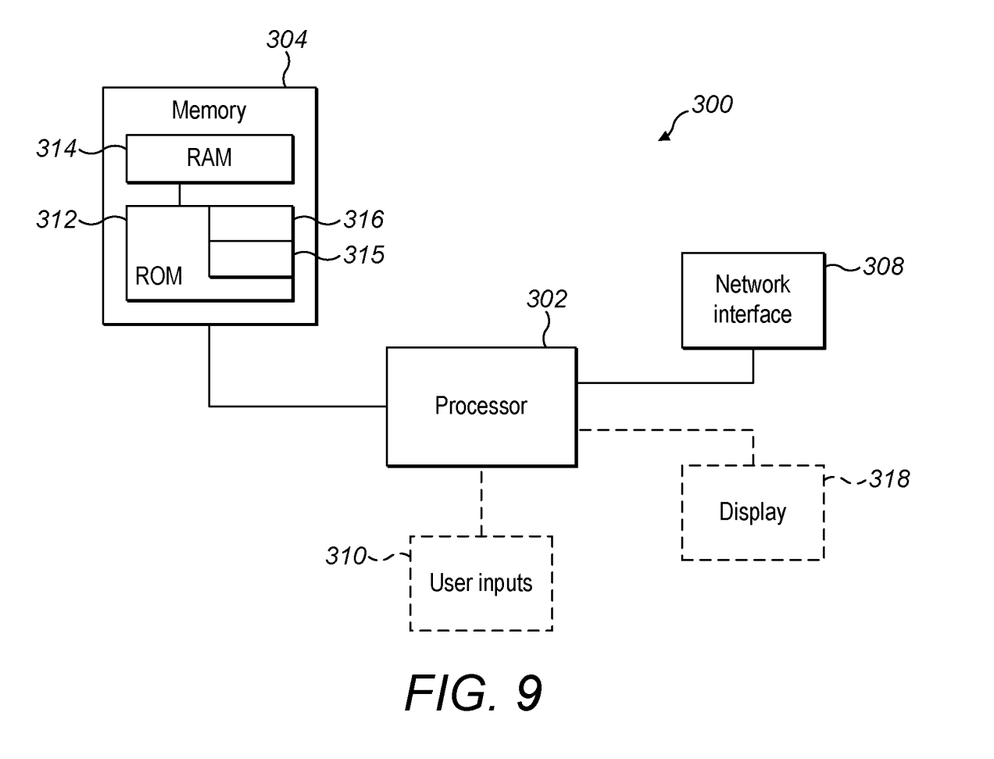
FIG. 9 is a block diagram of a system in accordance with an example embodiment.

For completeness, FIG. 9 is a schematic diagram of components of one or more of the modules described previously, which hereafter are referred to generically as processing systems 300. A processing system 300 may have a processor 302, a memory 304 coupled to the processor and comprised of a RAM 314 and ROM 312, and, optionally, user inputs 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor, implements aspects of the algorithms 30 or 50.

The processor 302 may take any suitable form. For instance, it may be a microcontroller, plural microcontrollers, a processor, or plural processors.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there.

Figure 10A:
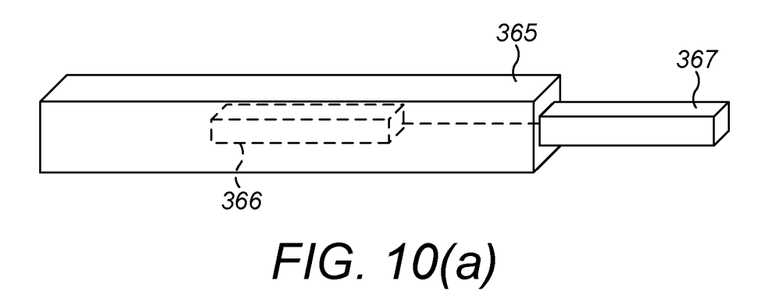
FIGS. 10a and 10b show tangible media, respectively a removable memory unit and a compact disc (CD) storing computer-readable code which when run by a computer perform operations according to example embodiments.
Figure 10B:
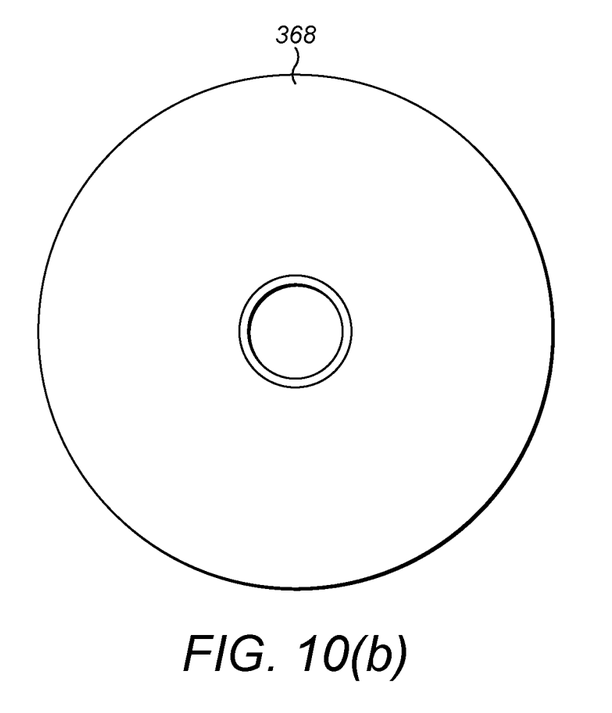

FIG. 10a and FIG. 10b show tangible media, respectively a removable memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 3 and 5 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; and at least one memory including computer program code, the at least one memory and computer program code configured to, with the at least one processor, cause:
   determining a position of a plurality of users, each having a different position within a volumetric space; and
   identifying a portion of the volumetric space to be selected for rendering a message, wherein the identified portion is one that is determined to be viewable to all of the plurality of users from the different positions;
   determining a rendering of a message within the volumetric space at the identified portion, based, at least in part, on the determined positions of said users, such that the message is one or more of: visible to, audible by and/or touchable by each of said users.

2. An apparatus as claimed in claim 1, wherein the at least one memory and the computer program code are configured to, with the at least one processor, cause rendering of the message based on the determined rendering.

3. An apparatus as claimed in claim 1, wherein the at least one memory and the computer program code are configured to, with the at least one processor, cause determining an orientation of each of said users.

4. An apparatus as claimed in claim 3, wherein determining the orientation of each of said users includes determining a gaze direction of each of said users.

5. An apparatus as claimed in claim 3, wherein determining the rendering of the message within the volumetric space comprising determining the rendering based, at least in part, on the determined orientation of said users.

6. An apparatus as claimed in claim 1, wherein the at least one memory and the computer program code are configured to, with the at least one processor, cause:
   determining a change in a position and/or orientation of one or more of said users, and
   wherein determining the rendering of the message includes updating the rendering of the message within the volumetric space based on the determined change.

7. An apparatus as claimed in claim 1,
   wherein determining the rendering of the message comprises rendering the message within the volumetric space such that the message is available to all of said users that have not acknowledged the message.

8. An apparatus as claimed in claim 1, wherein the message is audible by the users, and wherein determining the rendering of a message within the volumetric space comprises:
   defining an audio volume of the message depending on a location of the users; and/or
   defining an audio directionality of the message depending on a location of the users.

9. An apparatus as claimed in claim 1, wherein the plurality of users are relevant users, such that the message is directed to said relevant users.

10. An apparatus as claimed in claim 1, wherein:
   the message is one or more of an audio, visual image, visual video, text or tactile message; and/or
   the volumetric space is one or more of a virtual reality, augmented reality or mixed reality space.

11. A method comprising:
   determining a position of a plurality of users within a volumetric space;

identifying a portion of the volumetric space to be selected for rendering a message, wherein the identified portion is one that is determined to be viewable to all of the plurality of users from the different positions; and determining a rendering of a message within the volumetric space at the identified portion, based, at least in part, on the determined positions of said users, such that the message is one or more of: visible to, audible by and touchable by each of said users.

12. A method as claimed in claim 11, further comprising rendering the message accordingly.

13. A method as claimed in claim 12, further comprising determining a change in a position and/or orientation of one or more of said users, wherein determining the rendering of the message includes updating the rendering of the message within the volumetric space based on the determined change.

14. A method as claimed in claim 11, wherein rendering of a message within the volumetric space further comprises rendering the message such that the message is available to all of said users that have not acknowledged the message.

15. A method as claimed in claim 11, wherein the message is audible by the users, and wherein determining a rendering of a message within the volumetric space comprises:

defining an audio volume of the message depending on a location of the users; and/or defining an audio directionality of the message depending on a location of the users.

16. A computer program comprising instructions stored thereon for performing at least the following:

determining a position of a plurality of users, each having a different position within a volumetric space;

identifying a portion of the volumetric space to be selected for rendering a message, wherein the identified portion is one that is determined to be viewable to all of the plurality of users from the different positions; and determining a rendering of a message within the volumetric space at the identified portion, based, at least in part, on the determined positions of said users, such that the message is one or more of: visible to, audible by and/or touchable by each of said users.

* * * * *